(12) United States Patent
Skaff et al.

(10) Patent No.: US 8,860,565 B2
(45) Date of Patent: Oct. 14, 2014

(54) INFORMATION DISPLAY SYSTEM AND METHOD

(75) Inventors: Ryan Skaff, Farmington Hills, MI (US); Dale Gilman, Beverly Hills, MA (US); Paul Aldighieri, Grosse Pointe Farms, MI (US)

(73) Assignee: Ford Global Technlogies, LLC, Dearborn, MI (US)

( * ) Notice: Subject to any disclaimer, the term of this patent is extended or adjusted under 35 U.S.C. 154(b) by 641 days.

(21) Appl. No.: 12/985,429

(22) Filed: Jan. 6, 2011

(65) Prior Publication Data

US 2012/0176231 A1 Jul. 12, 2012

(51) Int. Cl.
*B60Q 1/00* (2006.01)
*B60R 16/023* (2006.01)
*B60K 35/00* (2006.01)

(52) U.S. Cl.
CPC ..... *B60R 16/0236* (2013.01); *B60K 2350/1092* (2013.01); *B60K 35/00* (2013.01)
USPC ............ 340/439; 340/995.14; 340/995.19; 340/995.23; 340/995.27; 340/425.5; 340/428; 340/438; 340/450.2; 340/455; 340/461; 340/464; 340/636.1; 340/691.6; 340/901; 701/22; 701/123; 701/423; 701/527

(58) Field of Classification Search
None
See application file for complete search history.

(56) References Cited

U.S. PATENT DOCUMENTS

| | | |
|---|---|---|
| 2,685,198 A | 8/1954 | Saul, Sr. |
| 3,977,238 A | 8/1976 | Byington, Jr. |
| 4,113,046 A | 9/1978 | Arpino |
| 4,590,568 A | 5/1986 | Barske et al. |
| 5,459,666 A | 10/1995 | Casper et al. |
| 5,916,298 A * | 6/1999 | Kroiss et al. ............ 701/123 |
| 6,453,731 B1 * | 9/2002 | Yaegashi ............ 73/114.52 |
| 6,467,337 B2 * | 10/2002 | Sadahiro et al. ......... 73/114.54 |
| 6,480,106 B1 | 11/2002 | Crombez et al. |
| 7,024,306 B2 | 4/2006 | Minami et al. |
| 7,072,762 B2 | 7/2006 | Minami et al. |
| 7,237,203 B1 * | 6/2007 | Kuenzner ............ 715/764 |

(Continued)

FOREIGN PATENT DOCUMENTS

| | | |
|---|---|---|
| JP | 3780521 B2 | 8/1999 |
| JP | 2007078699 A | 3/2007 |

OTHER PUBLICATIONS

U.S. Appl. No. 12/985,425, pp. 1-25.

(Continued)

*Primary Examiner* — Curtis King
(74) *Attorney, Agent, or Firm* — Jennifer M. Stec; Brooks Kushman P.C.

(57) ABSTRACT

An efficiency gauge from a vehicle information display may incorporate vehicle range information in addition to an efficiency indicator. The range information may be displayed as an area on the efficiency gauge indicating a safe operating region for average driving in order for the vehicle to reach a target destination entered by a driver before an on-board energy source is depleted. By maintaining a vehicle's average trip efficiency within the safe operating region through driving behavior, the display may convey that the vehicle will be able to make it to the target destination. Over the course of a trip, the safe operating region may be constantly updated to reflect the current state of the battery and the remaining distance to the target destination. If no target information is received, a default target distance value based on an initial distance to empty estimation may be used.

6 Claims, 3 Drawing Sheets

(56) References Cited

U.S. PATENT DOCUMENTS

| | | |
|---|---|---|
| 2003/0006914 A1 | 1/2003 | Todoriki et al. |
| 2007/0247291 A1 | 10/2007 | Masuda et al. |
| 2009/0157290 A1* | 6/2009 | Ji et al. .......................... 701/123 |
| 2009/0243827 A1 | 10/2009 | Burke et al. |
| 2009/0288636 A1 | 11/2009 | Saito et al. |
| 2010/0057280 A1* | 3/2010 | Crowe et al. .................... 701/22 |
| 2010/0057281 A1 | 3/2010 | Lawyer et al. |
| 2010/0106351 A1* | 4/2010 | Hanssen et al. ................. 701/22 |
| 2011/0032110 A1* | 2/2011 | Taguchi ...................... 340/636.1 |
| 2011/0241861 A1* | 10/2011 | Levy et al. ..................... 340/439 |
| 2012/0293122 A1* | 11/2012 | Murawaka .................... 320/109 |

OTHER PUBLICATIONS

U.S. Patent & Trademark Office Non-Final Office Action, May 21, 2013, U.S. Appl. No. 12/985,425, pp. 1-12.

* cited by examiner

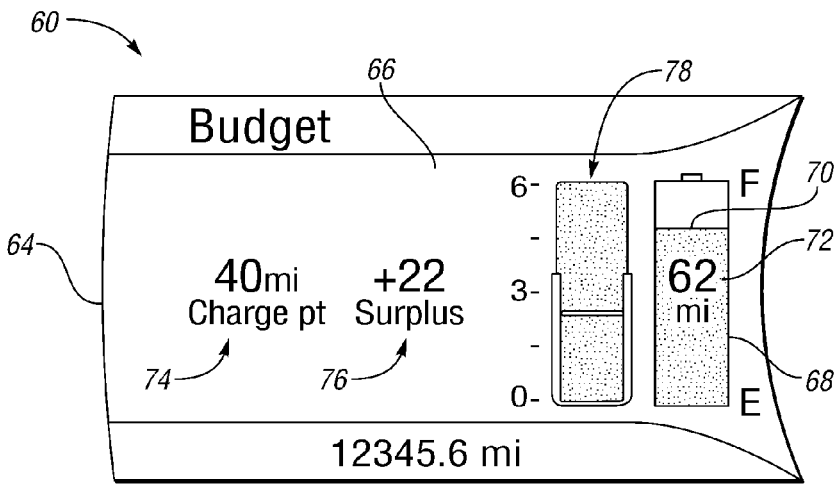
*Fig. 2*
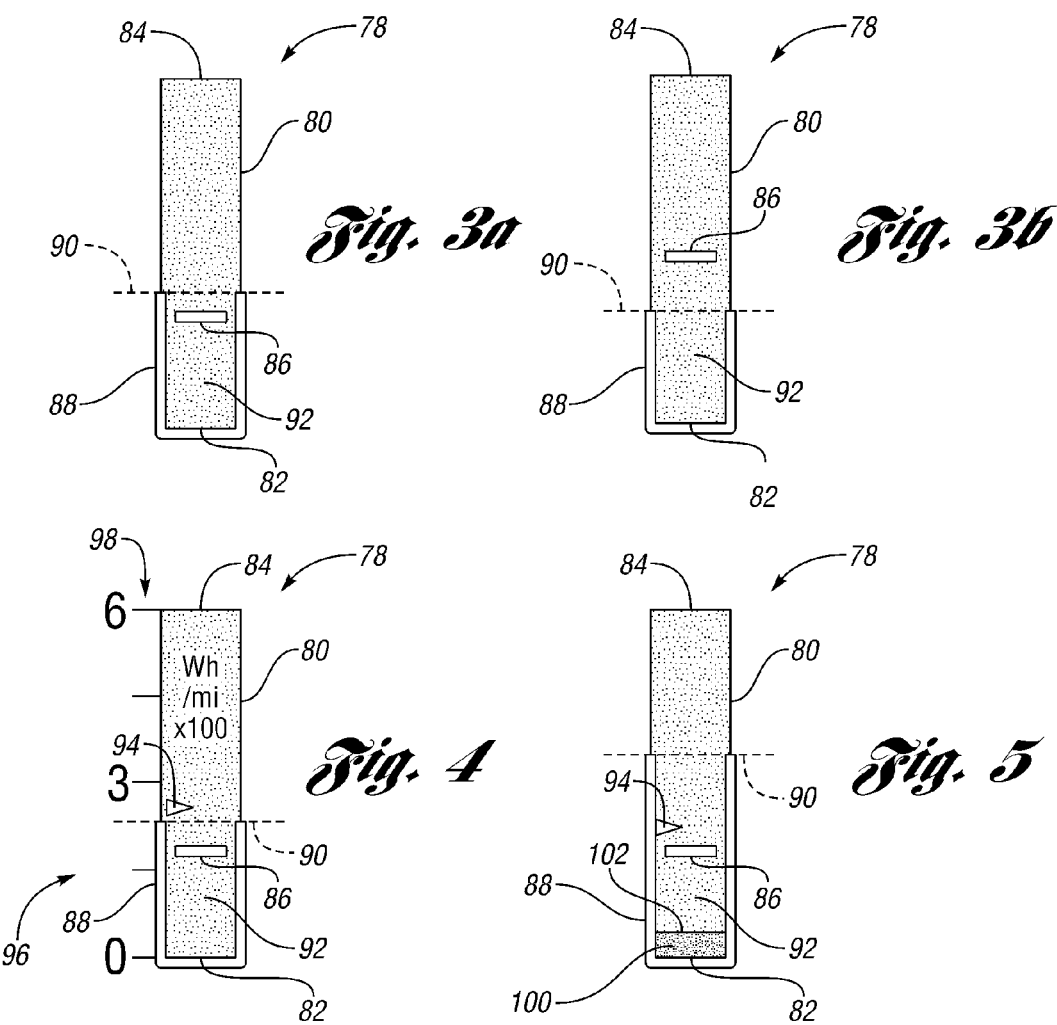
*Fig. 3a*  *Fig. 3b*
*Fig. 4*  *Fig. 5*

INFORMATION DISPLAY SYSTEM AND METHOD

TECHNICAL FIELD

The present application relates to an information display system and method for displaying an efficiency gauge that conveys vehicle operating efficiency and range information together to indicate an energy consumption budget.

BACKGROUND

All vehicles, whether passenger or commercial, include a number of gauges, indicators, and various other displays to provide the vehicle operator with information regarding the vehicle and its surroundings. With the advent of new technologies, such as hybrid electric vehicles (HEVs), plug-in hybrid electric vehicle (PHEVs) and battery electric vehicles (BEVs), has come a variety of new gauges and information displays that help guide drivers to better learn, understand and trust the operation of these vehicles that utilize new technology. For example, many HEVs incorporate gauges that attempt to provide the driver with information on the various hybrid driving states. Some gauges will indicate to the driver when the vehicle is being propelled by the engine alone, the motor alone, or a combination of the two. Similarly, a display may indicate when the motor is operating as a generator, and is recharging an energy storage device, such as a battery.

It is known that some drivers may not be able to achieve desired fuel economy or energy efficiency numbers, in part because of driving habits. In many cases, drivers are willing to modify their behavior, but are unable to translate recommended techniques into real changes in their driving habits. With the increase in sensing electronics, computers and other related technology on board a vehicle, the amount of information that can be communicated to the driver is virtually limitless. Often, the driver may not even know of all the features and capabilities their vehicle has to offer. Displaying certain types of information, particularly information relevant to HEVs, PHEVs or BEVs, can help facilitate economical driving choices.

SUMMARY

According to one or more embodiments of the present application, an information display system is provided comprising an information display and a controller in communication with the information display. The information display may include an energy consumption gauge having a threshold and an efficiency indicator. Moreover, the controller may be configured to determine a target distance, calculate a threshold value associated with the threshold based upon a battery state and the target distance, calculate an efficiency value associated with the efficiency indicator, and transmit signals causing the information display to adjust the threshold based on the threshold value and the efficiency indicator based upon the efficiency value.

Determining a target distance may include establishing an initial target distance value, calculating a current target distance value based upon the initial target distance value and a current distance traveled since the initial target distance value was established, and setting the target distance to the current target distance value. Establishing an initial target distance value may include receiving user input corresponding to the initial target distance value and setting the initial target distance value based on the user input. The user input may be an actual distance value. Alternatively, establishing an initial target distance value may include determining whether user input corresponding to the initial target distance value has been received and substituting a default value as the initial target distance value upon a determination that no user input was received. Substituting a default value as the initial target distance value may include estimating a current distance to empty (DTE) value and setting the current DTE value as the default value. The current DTE value may be based on the battery state and an energy consumption history. Additionally or alternatively, determining a target distance may include receiving the target distance from a navigation system based on a programmed route.

According to one or more embodiments of the present application, method for displaying a vehicle gauge is provided. The method may include determining a target distance for the vehicle, calculating a threshold value based upon a current battery state and the target distance, calculating an efficiency value based on driving behavior, and displaying an efficiency gauge having an efficiency indicator corresponding to the efficiency value and threshold corresponding to the threshold value.

Determining the target distance may include establishing an initial target distance value, calculating a current target distance value based upon the initial target distance value and a current distance traveled since the initial target distance value was established, and setting the target distance to the current target distance value. Establishing the initial target distance value may include receiving user input corresponding to the initial target distance value and setting the initial target distance value based on the user input. The user input may be an actual distance value. Alternatively, establishing the initial target distance value may include determining whether user input corresponding to the initial target distance value has been received and substituting a default value as the initial target distance value upon a determination that no user input was received. Further, substituting a default value as the initial target distance value may include estimating a current distance to empty (DTE) value and setting the current DTE value as the default value. The current DTE value may be based on the battery state and an energy consumption history. Additionally or alternatively, determining the target distance may include receiving the target distance from a navigation system based on a programmed route. Calculating the threshold value based upon a current battery state and the target distance may include determining a current amount of energy remaining in a main battery and dividing the current amount of energy remaining in the main battery by the target distance.

According to one or more additional embodiments of the present application, an energy consumption gauge may be provided. The energy consumption gauge may include a linear bar having an upper limit and a lower limit. The energy consumption gauge may further include an efficiency indicator movable between the upper limit and the lower limit. The efficiency indicator may correspond to an energy consumption rate. Further, the energy consumption gauge may include an energy budget element having a base disposed at the lower limit and a threshold based upon a current battery state and a target distance. The target distance may be based on driver input. Alternatively, the target distance may be an initial distance to empty value estimated at the start of a trip minus a trip distance.

BRIEF DESCRIPTION OF THE DRAWINGS

FIG. 2 depicts an exemplary information display according to one or more embodiments of the present application;

FIG. 3a depicts an exemplary efficiency gauge according to one or more embodiments of the present application;

FIG. 3b depicts an alternative view of the exemplary efficiency gauge shown in FIG. 3a;

FIG. 4 depicts another exemplary efficiency gauge according to one or more embodiments of the present application;

FIG. 5 depicts yet another exemplary efficiency gauge according to one or more embodiments of the present application.

DETAILED DESCRIPTION

As required, detailed embodiments of the present application are disclosed herein; however, it is to be understood that the disclosed embodiments are merely exemplary of an invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ one or more embodiments of the present application.

Figure 1:
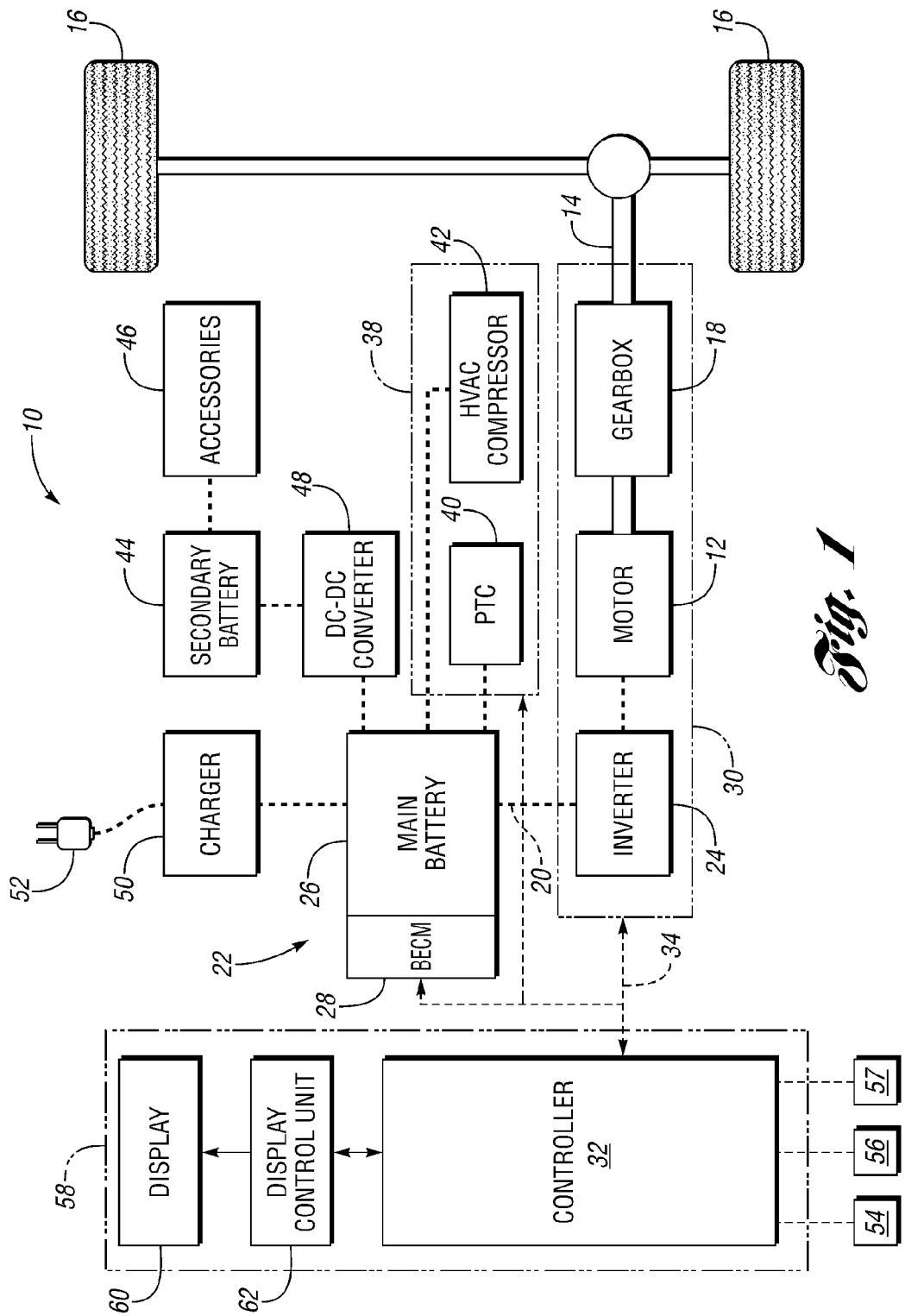
FIG. 1 is a simplified, exemplary schematic representation of a vehicle including an information display system according to one or more embodiments of the present application.

Referring now to the drawings, FIG. 1 is a simplified, exemplary schematic representation of a vehicle 10. As seen therein, the vehicle 10 may be a battery electric vehicle (BEV), which is an all-electric vehicle propelled by one or more electric machines without assistance from an internal combustion engine. The one or more electric machines of the vehicle 10 may include a traction motor 12. The motor 12 may output torque to a shaft 14, which may be connected to a first set of vehicle drive wheels, or primary drive wheels 16, through a gearbox 18. Other vehicles within the scope of the present application may have different electric machine arrangements, such as more than one traction motor. In the embodiment shown in FIG. 1, the traction motor 12 can be used as a motor to output torque to propel the vehicle 10. Alternatively, the motor 12 can also be used as a generator, outputting electrical power to a high voltage bus 20 and to an energy storage system 22 through an inverter 24.

The energy storage system 22 may include a main battery 26 and a battery energy control module (BECM) 28. The main battery 26 may be a high voltage battery that is capable of outputting electrical power to operate the motor 12. According to one or more embodiments, the main battery 26 may be a battery pack made up of several battery modules. Each battery module may contain a plurality of battery cells. The battery cells may be air cooled using existing vehicle cabin air. The battery cells may also be heated or cooled using a fluid coolant system. The BECM 28 may act as a controller for the main battery 26. The BECM 28 may also include an electronic monitoring system that manages temperature and state of charge of each of the battery cells. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 12, the gearbox 18, and the inverter 24 may generally be referred to as a transmission 30.

To control the components of the transmission 30, a vehicle control system, shown generally as a vehicle controller 32, may be provided. Although it is shown as a single controller, it may include multiple controllers that may be used to control multiple vehicle systems. For example, the controller 32 may be a vehicle system controller/powertrain control module (VSC/PCM). In this regard, the PCM portion of the VSC/PCM may be software embedded within the VSC/PCM, or it can be a separate hardware device.

A controller area network (CAN) 34 may allow the controller 32 to communicate with the transmission 30 and the BECM 28. Just as the main battery 26 includes a BECM, other devices controlled by the controller 32 may have their own controllers or sub-controllers. For example, the transmission 30 may include a transmission control module (TCM) (not shown), configured to coordinate control of specific components within the transmission 30, such as the motor 12 and/or the inverter 24. For instance, the TCM may include a motor controller. The motor controller may monitor, among other things, the position, speed, power consumption and temperature of the motor 12. Using this information and a throttle command by the driver, the motor controller and the inverter 24 may convert the direct current (DC) voltage supply by the main battery 26 into signals that can be used to drive the motor 12. Some or all of these various controllers can make up a control system, which, for reference purposes, may be the controller 32. Although illustrated and described in the context of the vehicle 10, which is a BEV, it is understood that embodiments of the present application may be implemented on other types of vehicles, such as those powered by an internal combustion engine, either alone or in addition to one or more electric machines (e.g., HEVs, PHEVs, etc.).

The vehicle 10 may also include a climate control system 38. The climate control system 38 may include both heating and cooling components. For instance, the climate control system 38 may include a high voltage positive temperature coefficient (PTC) electric heater and controller 40. The PTC 40 may be used to heat coolant that circulates to a passenger car heater. Heat from the PTC 40 may also be circulated to the main battery 26. The climate control system 38 may also include a high voltage electric HVAC compressor 42. Both the PTC 40 and the HVAC compressor 42 may draw electrical energy directly from the main battery 26. Moreover, the climate control system 38 may communicate with the controller 32. The on/off status of the climate control system 38 can be communicated to the controller 32, and can be based on, for example, the status of an operator actuated switch, or the automatic control of the climate control system 38 based on related functions such as window defrost.

In addition to the main battery 26, the vehicle 10 may include a separate, secondary battery 44, such as a typical 12-volt battery. The secondary battery 44 may be used to power the vehicle's various other accessories, headlights, and the like (collectively referred to herein as accessories 46). A DC-to-DC converter 48 may be electrically interposed between the main battery 26 and the secondary battery 44. The DC-to-DC converter 48 may allow the main battery 26 to charge the secondary battery 44.

The vehicle 10, which is shown as a BEV, may further include an alternating current (AC) charger 50 for charging the main battery 26 using an off-vehicle AC source. The AC charger 50 may include power electronics used to convert the off-vehicle AC source from an electrical power grid to the DC voltage required by the main battery 26, thereby charging the main battery 26 to its full state of charge. The AC charger 50 may be able to accommodate one or more conventional voltage sources from an off-vehicle electrical grid (e.g., 110 volt, 220 volt, etc.). The AC charger 50 may be connected to the off-vehicle electrical grid using an adaptor, shown schematically in FIG. 1 as a plug 52.

Also shown in FIG. 1 are simplified schematic representations of a braking system 54, an acceleration system 56, and a navigation system 57. The braking system 54 may include such things as a brake pedal, position sensors, pressure sensors, or some combination of the two, as well as a mechanical connection to the vehicle wheels, such as the primary drive wheels 16, to effect friction braking. The braking system 54 may also include a regenerative braking system, wherein braking energy may be captured and stored as electrical energy in the main battery 26. Similarly, the acceleration system 56 may include an accelerator pedal having one or more sensors, which, like the sensors in the braking system 54, may communicate information such as throttle input to the controller 32. The navigation system 57 may include a navigation display, a global positioning system (GPS) unit, a navigation controller and inputs for receiving destination information or other data from a driver. The navigation system may also communicate distance and/or location information associated with the vehicle 10, its target destinations, or other relevant GPS waypoints. The controller 32 may communicate with each individual vehicle system to monitor and control vehicle operation according to programmed algorithms and control logic. In this regard, the controller 32 may help manage the different energy sources available and the mechanical power being delivered to the wheels 16 in order to maximize the vehicle's range. The controller 32 may also communicate with a driver as well.

In addition to the foregoing, the vehicle 10 may include an information display system 58 to facilitate communications with a driver. As explained in detail below, the information display system 58 may provide relevant vehicle content to a driver of the vehicle 10 before, during or after operation. As shown in FIG. 1, the information display system 58 may include the controller 32 and an information display 60. The information display system 58 may also include its own control system, which, for reference purposes, may be a display control unit 62. The display control unit 62 may communicate with the controller 32 and may perform control functions on the information display 60, although the controller 32 may also function as the information display's control system. The controller 32 may be configured to receive input that relates to current operating conditions of the vehicle 10. For instance, the controller 32 may receive input signals from the BECM 28, the transmission 30 (e.g., motor 12 and/or inverter 24), the climate control system 38, the braking system 54, the acceleration system 56, or the like. The controller 32 may provide output to the display control unit 62 such that the information display 60 conveys energy consumption and range information, or other information relating to the operation of the vehicle 10 to a driver.

The information display 60 may be disposed within a dashboard (not shown) of the vehicle 10, such as an instrument panel or center console area. Moreover, the information display 60 may be part of another display system, such as the navigation system 57, or may be part of a dedicated information display system. The information display 60 may be a liquid crystal display (LCD), a plasma display, an organic light emitting display (OLED), or any other suitable display. The information display 60 may include a touch screen for receiving driver input associated with selected areas of the information display 60. The information display system 58 may also include one or more buttons (not shown), including hard keys or soft keys, located adjacent the information display 60 for effectuating driver input. Other operator inputs known to one of ordinary skill in the art may also be employed without departing from the scope of the present application.

Referring generally to FIG. 2, the information display 60 is shown in greater detail in accordance with one or more embodiments of the present application. As seen therein, the information display 60 may display one or more display screens 64 that may change to convey different information to the driver. To that end, the one or more display screens 64 may be selectable or non-selectable and may transition upon receipt of driver or vehicle input at the controller 32 and/or display control unit 62.

As shown in FIG. 2, the one or more display screens 64 of the information display 60 may include a budget view or screen 66. The budget screen 66 may include a battery gauge 68 having a battery state of charge (SOC) indicator 70. The SOC indicator 70 may convey the relative amount of electrical energy remaining in the main battery 26. BEVs may have a limited range or distance that can be traveled before the main battery 26 is depleted. Accordingly, the range of a vehicle may also be referred to as its distance to empty (DTE) value. To convey the DTE value, the battery gauge 68 may also include a DTE indicator 72. As shown in FIG. 2, the DTE indicator 72 may be a digital data readout of the DTE value in units of distance (e.g., miles, kilometers, etc.) Alternatively, the DTE indicator 72 may be displayed elsewhere on the budget screen 66.

How the vehicle 10 is driven can be an important factor in determining how long the remaining charge in the main battery 26 will last. For instance, aggressive driving behavior may deplete the main battery 26 more rapidly than relatively conservative driving behavior. To this end, the operation of the vehicle 10 may be continuously monitored and analyzed in order to determine the impact of driving behavior on the vehicle's range. The controller 32 may take into account past driving behavior, current driving behavior, or predicted future driving behavior. Along these lines, the budget screen 66 may convey how driving behavior is affecting the vehicle's "energy budget." The concept of an energy budget in the context of the vehicle 10 may relate to an amount or rate of energy consumption that can be afforded without depleting the main battery 26 prior to reaching an intended target (e.g., next charge point, final destination, etc.).

As mentioned previously, BEVs may have limited range; they may also have limited opportunities to recharge. As such, the budget screen 66 may convey vehicle range information and target distance information to provide drivers with reassurance that they will be able to make it to their next charge point. If they are unable to reach their destination, the budget screen 66 may also provide drivers plenty of warning so they can either modify their driving behavior in order to reach their target or change their target destination. Thus, in addition to the battery gauge 68, the budget screen 66 may include a distance to target (DTT) 74 indicator corresponding to a current target distance. As previously mentioned, the target distance may correspond to the current distance from the vehicle 10 to a destination. According to one or more embodiments, the destination may be an intermediate charging location, final trip destination, or the like. Moreover, the destination may be input by a driver (e.g., via the navigation system 57 or separate target input screen) or may be selected by the vehicle 10 as a default target.

Similar to the DTE indicator 72, the DTT indicator 74 may also be a digital data readout of the target distance value. When the DTT value is less than the DTE value, the vehicle 10 may be considered to be operating with an energy "surplus." Conversely, when the DTT value exceeds the DTE value, then the vehicle 10 may be considered to be operating with an energy deficit or "debt." Accordingly, the budget screen 66 may further include a surplus indicator 76 to convey to a driver whether the vehicle 10 has sufficient electrical energy to reach its target. The surplus indicator 76 may also convey the magnitude or amount of the debt/surplus in units of distance. Like the DTE indicator 72 and the DTT indicator 74, the surplus indicator 76 may also be a digital data readout. As shown in FIG. 2, the amount of surplus (debt) may be obtained by subtracting the target distance (DTT) value from the DTE value.

In addition to being shown as digital data, energy budget information may also be conveyed graphically. As shown in FIG. 2, the budget screen 66 may further include an efficiency gauge 78. The efficiency gauge 78 can also incorporate information about the range of the vehicle 10 and the target distance. As will be explained in greater detail below, the efficiency gauge 78 can help drivers visualize an energy consumption budget. In particular, the efficiency gauge 78 can help drivers determine whether the vehicle 10 is consuming more energy than they can afford in order to reach their target. The efficiency gauge 78 may inform drivers whether they are likely to reach their destination or not so that driving behavior can be modified accordingly.

FIGS. 3a and 3b depict the efficiency gauge 78 in greater detail according to one or more exemplary embodiments. As seen therein, the efficiency gauge 78 may be a linear or non-linear gauge having a vertical (or horizontal) bar 80. The bar 80 may include a lower limit 82 and an upper limit 84. The efficiency gauge 78 may include an instantaneous efficiency indicator 86 that moves along the bar 80 between the lower limit 82 and the upper limit 84 to convey an instantaneous efficiency value to a driver. Although described in terms of efficiency, the efficiency gauge 78 may actually convey information about the usage of energy in real units. To this end, the efficiency gauge 78 may be an energy consumption gauge displaying energy consumption rates. For instance, the efficiency gauge 78 may convey an amount of energy consumed per unit of distance. In this regard, the less energy consumed per unit distance may correspond to more efficient operation of the vehicle 10. By the same token, the closer the instantaneous efficiency indicator 86 is to the lower limit 82 of the efficiency gauge 78, the more energy efficient the vehicle 10 may be operating at a given instant.

As previously mentioned, drivers want to be reassured that they will be able to reach their target before the main battery 26 is depleted. Drivers also want to receive sufficient warning if their current vehicle operating behavior is consuming more energy than they can afford to expend in order to reach the target. In order to alleviate this range anxiety, the efficiency gauge 78 may also include energy budget information. The energy budget information may incorporate information about the range of the vehicle 10 (e.g., DTE) as well as the target distance. In particular, the efficiency gauge 78 may include an energy budget element 88. The budget element 88 may include a budget threshold 90 defining a safe operating region 92. For example, the safe operating region 92 may be defined as a region on the bar 80 between the budget threshold 90 and the lower limit 82. The safe operating region 92 may correspond to a region on the bar 80 in which the average efficiency of the vehicle 10 must be maintained in order to safely reach the target. The safe operating region 92 and corresponding budget threshold 90 may be based upon average driving. If a driver is able to keep the average efficiency (e.g., energy consumed per unit distance) within the safe operating region 92, the vehicle 10 should be able to make it to its destination. Over the course of a trip, the safe operating region 92 may be constantly updated to reflect the current state of the battery and the remaining target distance.

As previously described, the instantaneous efficiency may be conveyed in units of energy per unit distance (e.g., watt-hours per mile) to reflect an instantaneous energy consumption rate. The current capacity of the main battery 26 may be provided in units of energy (e.g., watt-hours). The target distance may, of course, be available in units of distance (e.g., miles). According to one or more embodiments of the present application, the budget threshold 90 may be calculated by dividing the current main battery capacity by the current target distance. Any efficiency values below the calculated budget threshold 90 may be considered to be in the safe operating region 92. By incorporating range information into the efficiency gauge 78, the safe operating region 92 can help drivers visualize an energy budget and determine whether they can afford the amount of energy they are currently consuming in order to reach their target destination. The instantaneous efficiency indicator 86 can provide an instantaneous snapshot of the amount of energy currently being expended. In this regard, the efficiency gauge 78 may assist drivers in better managing and/or modifying their driving behavior to consume energy at a rate within the safe operating region 92. In doing so, drivers may be assured that they will reach their destination.

The safe operating region 92 may increase as the ratio between the main battery capacity and the target distance increases. Conversely, the safe operating region 92 may decrease as the ratio between the main battery capacity and the target distance decreases. Thus, relatively efficient driving behavior may tend to cause an increase in the size of the safe operating region 92 (i.e., add to the energy budget). On the other hand, relatively inefficient driving behavior may tend to cause a decrease in the safe operating region 92 (i.e., subtract from the energy budget). According to one or more embodiments, the budget element 88 may be cup-shaped to symbolize the energy budget. The larger the cup, the greater the available energy budget may be to reach the target. As a result, a driver can afford to spend energy at a relatively higher rate, if desired, and still reach the next charge point.

FIG. 3a shows the instantaneous efficiency indicator 86 being displayed in the safe operating region 92. By operating a vehicle in such a way that the average efficiency stays within the safe operating region 92, a driver may be reassured of safely reaching the inputted target destination. FIG. 3b shows the instantaneous efficiency indicator 86 being displayed outside of the safe operating region 92. If the driver continues to operate the vehicle 10 in such a manner that would cause the average efficiency to remain outside of the safe operating region 92, then the vehicle 10 may be unable to reach the target on the main battery's current charge. Additionally or alternatively, if at any point the instantaneous consumption represented by the instantaneous efficiency indicator 86 can be maintained within the safe operating region 92, it may be possible to reach the end destination.

Referring now to FIG. 4, the efficiency gauge 78 may further include an average efficiency indicator 94 according to one or more embodiments of the present application. Like the instantaneous efficiency indicator 86, the average efficiency indicator 94 may convey information corresponding to an amount of energy consumed per unit of distance. The average efficiency indicator 94 may provide drivers with additional feedback so they can better manage their driving behavior in order to get the average efficiency indicator 94 inside the safe operating region 92 (or keep it there). The average efficiency indicator 94 may correspond to an average efficiency value. The average efficiency value may be calculated over a sliding window indicating past driving performance. The sliding window may correspond to a recent period of time or distance traveled. For example, the average efficiency value may correspond to driving performance over the last 15 minutes. Of course, alternate rolling time periods may be utilized. As another example, the sliding window may correspond to the driving performance for the current trip or a most recent predetermined number of miles.

According to one or more embodiments, the average efficiency indicator 94 may correspond to a lifetime average efficiency value. In this regard, the average efficiency value may be reset at the request of a driver. Alternatively, the average efficiency value may correspond to the average energy consumption rate for the current charge cycle. Thus, the average efficiency value may be reset after each battery charging session. As another alternative, the average efficiency value may be reset when a charge location is updated, changed or deleted. As yet another alternative, the average efficiency indicator 94 may be used to indicate an expected or predicted future efficiency. The expected future efficiency may be based on a measurement of past efficiency behavior.

As shown in FIG. 4, the information display 60 may selectively display a gauge scale 96 for the efficiency gauge 78. The gauge scale 96 may convey the actual energy efficiency values associated with the efficiency gauge 78. As previously described, the efficiency gauge 78 may convey vehicle operating efficiency in terms of an energy consumption rate (e.g., energy consumed per unit distance). In this regard, the gauge scale 96 may include a number of tick marks 98 conveying units of watt-hours per mile spaced periodically along the length of the efficiency gauge 78. Moreover, the lower limit 82 may correspond to an energy consumption rate of zero watt-hours per mile. As previously mentioned, the efficiency gauge 78 may be non-linear. Thus, efficiency values (e.g., energy consumption rates) may be mapped to the efficiency gauge 78 non-linearly to focus or zoom in on more relevant regions of the bar 80.

FIG. 5 depicts an exemplary efficiency gauge according to one or more alternate embodiments of the present application. As seen therein, the efficiency gauge 78 may include an accessory region 100 having an accessory floor 102. The accessory region 100 may correspond to the component of the current efficiency value that is due to accessory usage, rather than energy used to propel the vehicle 10. The accessory floor 102 may be displayed as a lower bound on the bar 80 of the efficiency gauge 78 indicating a minimum efficiency value (e.g., energy consumed per unit distance) that the driver can obtain solely through driving behavior changes. Accordingly, the accessory region 100 may provide a way to convey the proportion of energy consumption that is related to accessory usage as well as the portion related to throttle usage. As such, neither the instantaneous efficiency indicator 86 nor the average efficiency indicator 94 may drop below the accessory floor 102 solely through changes in driving behavior that reduce energy consumption (e.g., slower driving, slower acceleration, etc.).

The accessory floor 102 may correspond to a short-term rolling average of energy consumption from the use of accessories, such as the accessories 46 and the climate control system 38. As an example, the accessory floor 102 may be calculated by dividing the power output due to accessory usage by the vehicle speed averaged over a relatively short rolling distance or period of time. The controller 32 may account for special conditions when determining the accessory floor 102 so that its value is a representative equivalent of the current energy consumption rate due to accessory usage, rather than throttle usage. For example, the controller 32 may take into consideration instances in which the vehicle is idle (e.g., stopped at a traffic light) so that the accessory floor 102 is not displayed uncharacteristically high as a result of dividing power by zero.

Calculating the budget threshold 90 may depend on the remaining distance for the vehicle 10 to reach a target destination or suitable charging location (i.e., target distance). The target distance may be the final arbitrated distance remaining based on various potential driver inputs. For instance, the target distance may come from a driver specifically entering a distance to a target destination or charging location. This information may be entered directly into the information display system 58 using inputs provided at the instrument panel or center console, or the information may be entered indirectly via a cell phone, personal computer or the like. Alternatively, the target distance may be acquired from the navigation system 57 in which a driver inputs a destination and/or a sequence of navigation waypoints including a final charging location. In this regard, the vehicle 10 may then calculate the target distance based on the information provided by the driver. When no target information is provided, the vehicle 10 may predict the target distance based on past driving history, such as average trip distance or some other available metric.

Alternatively, if a target distance is not entered by a driver or is otherwise unavailable, a distance to empty (DTE) estimate may be used as a substitute value for the target distance. For example, if no charge point or target distance is entered at startup, a DTE estimate at the start of a trip may be used as a substitute value for the target distance. In this case, the distance remaining may count down from the initial DTE estimate based on the actual distance traveled (e.g., odometer mileage). For instance, if the initial DTE estimate at the start of a trip is 80 miles and the vehicle 10 has traveled 25 miles, the remaining target distance may be 55 miles. The remaining target distance may be 55 miles even if the current DTE estimate is not. If the vehicle 10 is driven relatively efficiently over the first 25 miles, the current DTE estimate may now be greater than 55 miles. If, on the other hand, the vehicle 10 is driven relatively inefficiently over the first 25 miles, then the current DTE estimate may be less than 55 miles. Additionally, if a charge point is cancelled mid-trip, a snapshot of the DTE at that moment may be substituted for the target distance and may then be counted down from there based on odometer mileage.

The DTE estimate may be based upon an average energy consumption profile. The average energy consumption profile may correspond to a theoretical or global average for all types of drivers. According to one or more embodiments, the average energy consumption profile from which the DTE is estimated may correspond to an average for the vehicle 10 or one of the vehicle's drivers. For instance, each driver of the vehicle 10 may be assigned a key ID identifying themselves to the vehicle 10. This may allow driver preferences, setting or other profile information, such as an average energy consumption profile, to be stored and recalled for each driver. The key ID may be input to the vehicle either actively or passively at startup. For example, each driver may manually enter a code associated with their key ID. Alternatively, the key ID may be automatically transmitted to the vehicle 10 using radio frequency (RF) technology. In particular, the key ID may be an RFID stored in a driver's key or key fob that, when interrogated, transmits the driver's ID to the vehicle 10.

The vehicle's average energy consumption profile may correspond to a lifetime average or an average for a past distance traveled, period of time or some other relevant event. When using a DTE estimate as a default substitute value when a target distance is not entered or becomes unavailable, the budget threshold 90 on the efficiency gauge 78 may help coach drivers to at least obtain the initially estimated DTE. In this regard, the efficiency gauge 78 with the budget threshold 90 may measure the drivers' current driving behavior against themselves. Moreover, the labels on the DTT indicator 74 and the surplus indicator 76 may change when a DTE estimate is substituted as the basis for the target distance to reflect the difference in the information being conveyed. For example, the label for the DTT indicator 74 may switch from "charge point" or a similar term to "budget" or another similar term. Similarly, the label for the surplus indicator 76 may switch from "surplus" or a similar term to "status" or another similar term.

Figure 6:
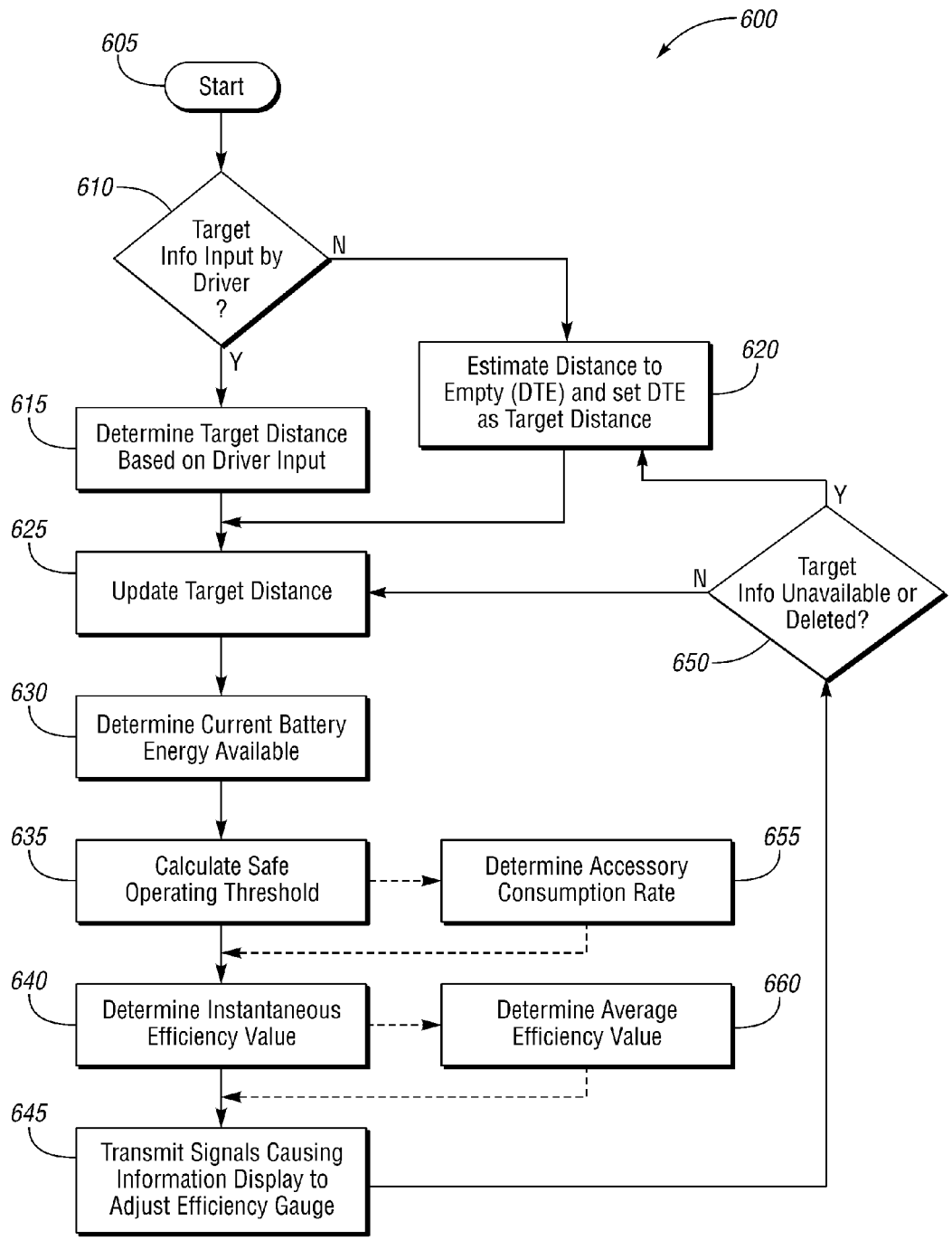
FIG. 6 is a simplified, exemplary flow chart depicting a method according to one or more embodiments of the present application.

FIG. 6 is a simplified, exemplary flowchart depicting a method 600 for displaying the efficiency gauge content according to one or more embodiments of the present application. Step 605 provides an entry to the method and may correspond to the start of a trip (e.g., a key-on event). At step 610, the controller 32 may determine whether target destination information has been input by a driver. If target information was entered by the driver, the method may proceed to step 615. At step 615, the controller 32 may determine the current target distance based on the driver's input. For instance, the driver may have entered an actual target distance. Alternately, the driver may have input destination information into the navigation system 57. As a result, the target distance may be determined based on a calculated route. If, at step 610, it is determined that target information was not entered by the driver or is otherwise unavailable, then the method may proceed to step 620. At step 620, the controller 32 may substitute a default value for the target distance. According to one or more embodiments, the controller 32 may estimate an initial distance to empty (DTE) value at the start of the trip and set the initial DTE as the substitute value for target distance.

Once the initial target distance is determined, the method may proceed to step 625. At step 625, the controller 32 may update the target distance by determining the remaining distance to the target. If the target information was provided by the navigation system 57, the updated target distance may correspond to the remaining distance to the target based on the planned route. Otherwise, the updated target distance may correspond to the initial target distance less the distance traveled (e.g., odometer mileage) since the initial target distance was entered. After the remaining target distance has been updated, the method may proceed to step 630.

At step 630, the controller 32 may determine the current state of charge (SOC) for the main battery 26. In particular, the controller 32 may determine the amount of remaining energy available for the main battery 26. Battery SOC information may be obtained from the BECM 28. Next, at step 635, the controller 32 may calculate the budget threshold 90. According to one or more embodiments, the budget threshold 90 may be based on the current battery capacity and the remaining target distance. For instance, the budget threshold 90 may be calculated by dividing the amount of remaining energy available from the main battery 26 by the updated target distance. At step 640, the controller 32 may also determine an instantaneous efficiency value for the vehicle 10. As previously described, the instantaneous efficiency value may correspond to an instantaneous energy consumption rate (e.g., energy per unit distance). The instantaneous energy consumption rate may be calculated using any one of several methods known to one of ordinary skill in the art. For example, the instantaneous energy consumption rate may correspond to the instantaneous power output by the vehicle 10 divided by the current vehicle speed.

Once the budget threshold value and instantaneous efficiency value are determined, the method may proceed to step 645. At step 645, the controller 32 may transmit signals corresponding to the budget threshold value and the instantaneous efficiency value. The transmitted signals may cause the information display 60 to adjust the efficiency gauge 78 accordingly. In particular, the transmitted signals may cause the information display 60 to adjust the budget element 88 and corresponding safe operating region 92 based upon the calculated budget threshold 90. Moreover, the transmitted signals may cause the information display 60 to adjust the instantaneous efficiency indicator 86 based upon the instantaneous efficiency value. The signals may be transmitted by the controller 32 to a display control unit 62 that drives the information display 60. Alternately, the controller 32 may include the display control unit 62 and the transmitted signals may directly drive the information display 60. Once the information display 60 is updated at step 645, the method may proceed to step 650.

At step 650, the controller may determine whether the target information has been deleted or otherwise become unavailable. If the target information remains available, the method may return to step 625 in which the target distance is once again updated. In this regard, the efficiency gauge 78 may be constantly updated to reflect the current state of the main battery 26 and the remaining distance to the target destination. If, on the other hand, the target information (e.g., charge point location or target distance) is deleted or is no longer available, then the method may return to step 220 where a snapshot of the DTE at that moment is taken and is used as a basis for the target distance value.

According to one or more embodiments of the present application, the method may also include a step 655. At step 655, the controller 32 may determine an accessory consumption rate. The accessory consumption rate may correspond to an equivalent energy consumption component resulting from accessory usage rather than throttle usage. The accessory consumption rate may define the accessory floor 102 as described with respect to FIG. 5. To this end, at step 645, the controller 32 may transmit signals causing the information display 60 to adjust the accessory region 100 on the efficiency gauge 78 based on the accessory consumption rate.

Additionally or alternatively, the method may further include a step 660. At step 660, the controller 32 may determine an average efficiency value. As previously described, the average efficiency value may correspond to an average energy consumption rate (e.g., energy per unit distance). The average energy consumption rate may be calculated using any one of several methods known to one of ordinary skill in the art. For example, the average energy consumption rate may correspond to the average power output by the vehicle 10 divided by the average vehicle speed. The average efficiency value may be based upon a lifetime average, trip average, charge cycle average, or the like. At step 645, the controller 32 may transmit signals causing the information display 60 to adjust the average efficiency indicator 94 on the efficiency gauge 78 based on the average efficiency value.

References to the controller 32 may correspond generally to any number of vehicle controllers capable of performing the methods described herein. As previously described, the controller 32 may include a VSC/PCM, vehicle control unit, motor control unit, display control unit, or the like. It should also be noted that the method of FIG. 6 as described herein is exemplary only, and that the functions or steps of the method could be undertaken other than in the order described and/or simultaneously as may be desired, permitted and/or possible.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An information display system comprising:
    an information display including an energy consumption gauge having a threshold and an efficiency indicator; and
    a controller in communication with the information display and configured to:
        calculate a target distance based on an initial distance-to-empty (DTE) value estimated at the start of a trip less a trip distance,
        calculate a threshold value associated with the threshold based upon a battery state and the target distance,
        calculate an efficiency value associated with the efficiency indicator, and
        transmit signals causing the information display to adjust the threshold based on the threshold value and the efficiency indicator based upon the efficiency value.

2. The information display system of claim 1, wherein the initial DTE value is based on the battery state at the start of the trip and an energy consumption history.

3. A display method comprising:
    receiving a target distance for a vehicle, the target distance equal to an initial distance-to-empty value estimated at the start of a trip less a trip distance;
    calculating a threshold value based upon a current battery state and the target distance;
    calculating an efficiency value based on driving behavior; and
    displaying an efficiency gauge having an efficiency indicator corresponding to the efficiency value and threshold corresponding to the threshold value.

4. The display method of claim 3, wherein the initial distance-to-empty value is based on the battery state at the start of the trip and an energy consumption history.

5. The display method of claim 3, wherein calculating the threshold value based upon a current battery state and the target distance comprises:
    receiving input indicative of a current amount of energy remaining in a main battery; and
    dividing the current amount of energy remaining in the main battery by the target distance.

6. An energy consumption gauge comprising:
    a linear bar having an upper limit and a lower limit;
    an efficiency indicator movable between the upper limit and the lower limit, the efficiency indicator corresponding to an energy consumption rate; and
    an energy budget element having a base disposed at the lower limit and a threshold based upon a current battery state and an initial distance-to-empty value estimated at the start of a trip less a trip distance.

* * * * *